(12) United States Patent
Wang

(10) Patent No.: US 11,898,951 B2
(45) Date of Patent: Feb. 13, 2024

(54) FORWARD SCATTERED LIGHT DETECTION SYSTEM, FLOW CYTOMETER AND METHOD FOR MEASURING CELL DIAMETER

(71) Applicants: HEFEI BOE OPTOELECTRONICS TECHNOLOGY CO., LTD., Hefei (CN); BOE TECHNOLOGY GROUP CO., LTD., Beijing (CN)

(72) Inventor: Xiaoli Wang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 893 days.

(21) Appl. No.: 16/830,973

(22) Filed: Mar. 26, 2020

(65) Prior Publication Data
US 2021/0055200 A1    Feb. 25, 2021

(30) Foreign Application Priority Data

Aug. 22, 2019  (CN) .......................... 201910780140.8

(51) Int. Cl.
*G01N 15/14* (2006.01)

(52) U.S. Cl.
CPC ... *G01N 15/1434* (2013.01); *G01N 2015/149* (2013.01); *G01N 2015/1493* (2013.01)

(58) Field of Classification Search
CPC ......... G01N 15/1434; G01N 2015/149; G01N 2015/1493; G01N 15/1459; G01N 15/1436; G01N 2015/1006
See application file for complete search history.

(56) References Cited

U.S. PATENT DOCUMENTS 6,549,275 B1    4/2003  Cabuz et al.
2004/0145725 A1*  7/2004  Fritz ................ A61B 5/150343
                                                        356/39

(Continued)

FOREIGN PATENT DOCUMENTS

CN    102906557 A    1/2013
CN    104075978 A    10/2014

(Continued)

OTHER PUBLICATIONS

First Chinese Office Action dated Aug. 10, 2021, received for corresponding Chinese Application No. 201910780140.8, 12 pages.

*Primary Examiner* — Gailene Gabel
(74) *Attorney, Agent, or Firm* — Kinney & Lange, P.A.

(57) ABSTRACT

A forward scattered light detection system, a flow cytometer and a method for measuring a cell diameter are provided. The forward scattered light detection system includes: a laser configured to emit light rays; a light focusing assembly configured to focus the light ray to a light spot; a first lens configured to convert the light spot to parallel light rays, wherein a center of the light spot is located on a main optical axis of the first lens; a blocking assembly configured to transmit a light ray propagating along and near the main optical axis through the blocking assembly and block most of the light ray propagating in directions other than the main optical axis; and a first detector configured to detect an intensity of the light ray transmitted from the blocking assembly to the first detector.

18 Claims, 6 Drawing Sheets

(56) References Cited

U.S. PATENT DOCUMENTS

| | | | |
|---|---|---|---|
| 2010/0035235 A1* | 2/2010 | Gabriel | G01N 15/0211 |
| | | | 435/7.1 |
| 2011/0222051 A1 | 9/2011 | Heng | |
| 2011/0294139 A1* | 12/2011 | Takeda | G01N 15/1484 |
| | | | 435/7.1 |
| 2014/0293281 A1 | 10/2014 | Yamamoto et al. | |
| 2017/0016828 A1 | 1/2017 | Xu et al. | |
| 2017/0146454 A1 | 5/2017 | Knox et al. | |
| 2018/0156710 A1 | 6/2018 | Vrane | |

FOREIGN PATENT DOCUMENTS

| | | |
|---|---|---|
| CN | 104458545 A | 3/2015 |
| CN | 106680186 A | 5/2017 |
| CN | 206546319 U | 10/2017 |
| CN | 207051160 U | 2/2018 |
| CN | 108351287 A | 7/2018 |
| CN | 207717594 U | 8/2018 |

* cited by examiner

FORWARD SCATTERED LIGHT DETECTION SYSTEM, FLOW CYTOMETER AND METHOD FOR MEASURING CELL DIAMETER

CROSS-REFERENCE TO RELATED APPLICATION

This application claims a priority to Chinese Patent Application No. 201910780140.8 filed on Aug. 22, 2019, the disclosure of which is incorporated in its entirety by reference herein.

TECHNICAL FIELD

The present disclosure relates to the field of medical instruments, and in particular, to a forward scattered light detection system, a flow cytometer and a method for measuring a cell diameter.

BACKGROUND

Flow cytometry is an important method for cell analysis, which is widely used in clinical medicine, cytology, biology, pharmacy and other fields. In flow cytometry, a laser or a xenon lamp is used to irradiate cells one by one, the cells scatter the light emitted by the laser or the xenon lamp or emit fluorescence under stimulation of the irradiated light, and the cells are analyzed or classified based on analysis of the scattered light and the fluorescence. Flow cytometry has some advantages such as a fast detection speed, multiple detection parameters and a high purity.

The flow cytometer in relevant technologies mainly detects three parameters including the forward scattered light, side scattered light and fluorescence of a cell after being irradiated by incident light. The forward scattered light is related to the size of the cell, the refractive index of the cell and the cell surface activity. The scattered light from the cell is related to the complexity of the interior of the cell. Different cells are labelled with different fluorescent agents to distinguish various types of cells.

SUMMARY

In a first aspect, an embodiment of the present disclosure provides a forward scattered light detection system, applied to a flow cytometer, including:

a laser, configured to emit light rays;

a light focusing assembly, configured to focus the light rays as a light spot;

a first lens, configured to convert the light spot to parallel light rays, where a center of the light spot is located on a main optical axis of the first lens;

a blocking assembly, configured to transmit a light ray propagating along and near the main optical axis through the blocking assembly and block most of the light rays propagating in directions other than the main optical axis; and a first detector, configured to detect an intensity of the light ray transmitted from the blocking assembly to the first detector, where a fluidics system of the flow cytometer is between the light focusing assembly and the first lens, and the main optical axis is perpendicular to and intersected with a flow direction of a cell suspension in the fluidics system.

In some optional embodiments, the blocking assembly is further configured to:

enable the intensity of the light ray detected by the first detector to be in a first light intensity range when a cell in the cell suspension from the fluidics system does not contact the main optical axis; and enable the intensity of the light ray detected by the first detector to be in a second light intensity range when the cell in the cell suspension from the fluidics system flows to contact the main optical axis, where light intensities in the second light intensity range are lower than light intensities in the first light intensity range.

In some optional embodiments, the blocking assembly includes a first blocking plate and a second blocking plate; the second blocking plate is between the first lens and the first detector, and the first blocking plate is between the second blocking plate and the light focusing assembly; and the first blocking plate is provided with a first slit at a position where the first blocking plate intersects the main optical axis, and the second blocking plate is provided with a second slit at a position where the second blocking plate intersects the main optical axis.

In some optional embodiments, a width of the first slit along the flow direction of the cell suspension is greater than or equal to a width of the second slit along the flow direction of the cell suspension, and the width of the second slit is greater than a wavelength of the light rays emitted by the laser.

In some optional embodiments, the laser, the light focusing assembly, the first blocking plate, the first lens, the second blocking plate, and the first detector are arranged in sequence along the main optical axis, and the first slit is at a focal point of the first lens.

In some optional embodiments, the laser, the light focusing assembly, the first lens, the first blocking plate, the second blocking plate, and the first detector are arranged in sequence along the main optical axis.

In some optional embodiments, the light focusing assembly includes: a first cylindrical lens and a second cylindrical lens that are on the main optical axis, the first cylindrical lens is configured to focus the light rays emitted by the laser along the main optical axis, and the second cylindrical lens is configured to focus the light rays emitted by the laser along the flow direction of the cell suspension, to enable the light rays passing through the light focusing assembly to form the light spot.

In some optional embodiments, centers of the light focusing assembly, the first blocking plate, the second blocking plate, and the first detector are located on the main light axis, and the light rays incident on the cell suspension is scattered by cells in the cell suspension when the cell suspension of the fluidics system flows to near the main optical axis.

In a second aspect, an embodiment of the present disclosure further provides a flow cytometer, including: the fluidics system and the forward scattered light detection system according to any embodiments disclosed in the first aspect.

In some optional embodiments, the flow cytometer further includes: a first light detection system configured to detect a side scattered light ray when the light ray from the laser is scattered by the cell suspension, and detect fluorescence emitted by cells in the cell suspension labelled by a fluorescent dye.

In some optional embodiments, the fluidics system includes:

a cylindrical steady flow cavity, configured to accommodate a sheath fluid;

a sample channel, configured to import a cell suspension, where the sample channel is in a center of the cylindrical steady flow cavity, a conical confluent cavity, in communication with the cylindrical steady flow cavity and the sample channel; and a capillary tube, connected to an exit of the conical confluent cavity, where an extending direction of the capillary tube perpendicularly intersects the main optical axis of the forward scattered light detection system, where the fluidics system is configured to: enable the sheath fluid and the cell suspension to simultaneously flow into the conical confluent cavity respectively through the cylindrical steady flow cavity and the sample channel, to make the sheath fluid encircle a cell in the cell suspension after confluence; and enable the light rays to be scattered by the encircled cell that flows in the capillary tube, when the encircled cell flows to a position where the capillary tube intersects the main optical axis of the forward scattered light detection system.

In some optional embodiments, the first light detection system includes:

a second lens, configured to convert the side scattered light rays and the fluorescence into parallel light rays;

a first detection branch at a main optical axis of the second lens, configured to detect the side scattered light ray transmitting through the second lens; and a second detection branch, configured to detect the fluorescence transmitting through the second lens, where the main optical axis of the forward scattered light detection system, the main optical axis of the second lens, and the flow direction of the cell suspension in the fluidics system are perpendicular.

In some optional embodiments, the first detection branch includes a first dichroic mirror, a third lens, and a second detector, the first dichroic mirror is configured to reflect the side scattered light ray from the second lens to the third lens, and the second detector is configured to receive the side scattered light after being converged by the third lens.

In some optional embodiments, the second detection branch includes a second dichroic mirror, a fourth lens and a third detector, the second dichroic mirror is configured to reflect the fluorescence from the second lens to the fourth lens, and the third detector is configured to receive the fluorescence after being converged by the fourth lens.

In some optional embodiments, the flow cytometer further includes: a cell sorting system, where the cell sorting system includes:

a charging device, disposed at a liquid outlet of the fluidics system, and configured to apply a positive voltage or a negative voltage to a part of cells in the cell suspension;

a first deflecting plate and a second deflecting plate, that are opposite to each other and are spaced below the charging device, where a first container is provided below the first deflecting plate and is configured to receive the positively charged cells, and a second container is provided below the second deflecting plate and is configured to receive the negatively charged cells; and a third container, disposed between the first container and the second container and located below the liquid outlet, and configured to receive the uncharged cells.

In a third aspect, an embodiment of the present disclosure further provides a method for measuring a cell diameter, applied to the flow cytometer according to any embodiments disclosed in the second aspect. The method includes:

obtaining a time duration during which a cell in the flow cytometer passes through the main optical axis of the forward scattered light detection system;

obtaining a velocity of the cell passing through the main optical axis; and calculating a diameter of the cell based on the obtained time duration and the velocity.

In some optional embodiments, the intensity of the light rays detected by the first detector is in a first light intensity range when a cell in the cell suspension from the fluidics system does not contact the main optical axis of the forward scattered light detection system, and an intensity of the light ray detected by the first detector is in a second light intensity range when the cell in the cell suspension from the fluidics system flows to contact the main optical axis of the forward scattered light detection system. The obtaining the time duration during which the cell in the flow cytometer passes through the main optical axis of the forward scattered light detection system includes:

recording a first moment when the detected light intensity is switching from the first light intensity range to the second light intensity range;

recording a second moment when the detected light intensity is switching from the second light intensity range to the first light intensity range; and subtracting the first moment from the second moment to obtain the time duration during which the cell in the flow cytometer passes through the main optical axis of the forward scattered light detection system.

BRIEF DESCRIPTION OF THE DRAWINGS

In order to explain technical solutions of embodiments of the present invention more clearly, drawings used in the description of the embodiments of the present disclosure will be briefly introduced below. Obviously, the drawings in the following description are just some embodiments of the present disclosure. For persons of ordinary skill in the art, other drawings can be obtained based on these drawings without creative efforts.

DETAILED DESCRIPTION

In order to enable persons of ordinary skill in the art to better understand technical solutions of the present disclosure, the present disclosure is described below in detail with reference to accompanying drawings and specific embodiments. The embodiments of the present disclosure are illustrated in further detail below with reference to the accompanying drawings and specific embodiments, which are not intended to limit the present disclosure.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including" or "comprising" and the like mean that an element or an article preceding the term contains elements or items and equivalents thereof behind the term, but does not exclude other elements or items. Such terms as "connect", "connected" or "connecting" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

In the present disclosure, when it is described that a specific device is located between a first device and a second device, there may or may not be an intervening device between the specific device and the first device or between the specific device and the second device. When it is described that a specific device is connected to another device, the specific device may be directly connected to the other device without an intervening device, or may be indirectly connected to the other device through an intervening device.

In related technologies, the size of a cell is mainly determined based on a light intensity of forward scattered light from the cell, which is used for primary selection of cells. The larger the cell size is, the stronger the intensity of the forward scattered light is, while the smaller the cell size is, the weaker the intensity of the forward scattered light is. Since the refractive index of a cell and the activity of the cell surface may adversely affect the intensity of the forward scattered light, the accuracy of the size of the cell measured based on the intensity of the forward scattered light may be low.

Figure 1:
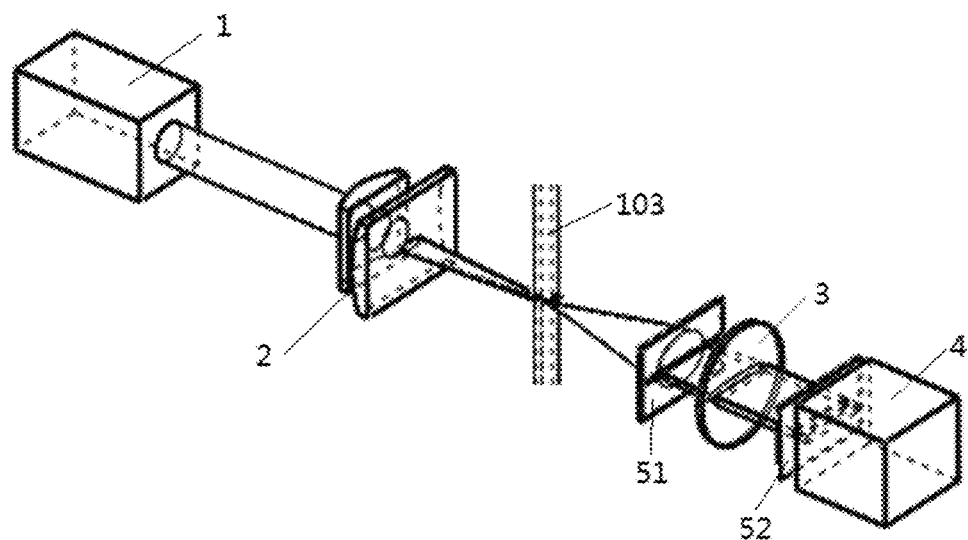
FIG. 1 is a schematic diagram of a forward scattered light detection system according to embodiments of the present disclosure.

In a first aspect, embodiments of the present disclosure provide a forward scattered light detection system for a flow cytometer. As shown in FIG. 1, the forward scattered light detection system includes:

a laser 1, configured to emit light rays;

a light focusing assembly 2, configured to focus the light rays as a light spot;

a first lens 3, configured to convert the light spot to parallel light rays, where a center of the light spot is located on a main optical axis of the first lens;

a blocking assembly, configured to transmit a light ray propagating along and near the main optical axis through the blocking assembly and block most of the light rays propagating in directions other than the main optical axis; and a first detector 4, configured to detect an intensity of the light ray transmitted from the blocking assembly to the first detector.

Figure 16:
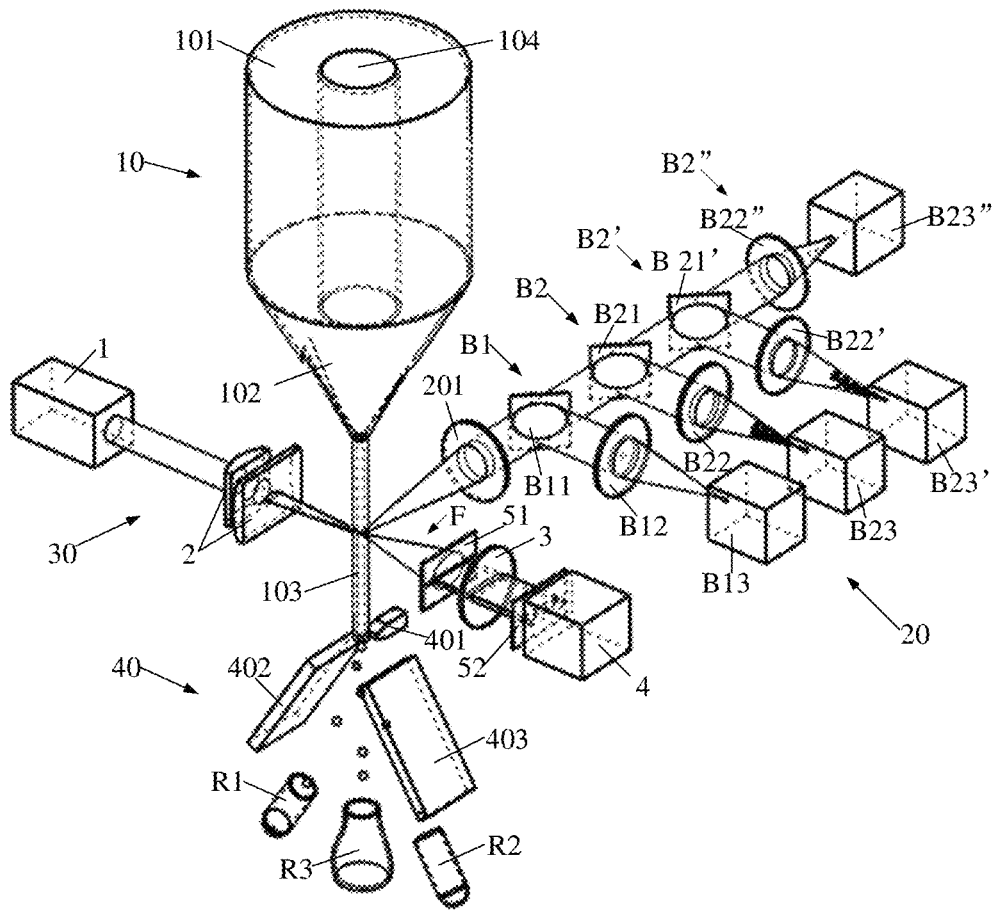
FIG. 16 is a schematic diagram of a flow cytometer according to optional embodiments of the present disclosure.

As shown in FIG. 16, a fluidics system 10 of the flow cytometer is located between the light focusing assembly 2 and the first lens 3, and the main optical axis is perpendicular to and intersected with a flow direction of a cell suspension in the fluidics system 10.

In some optional embodiments, the blocking assembly is configured to: enable the intensity of the light ray detected by the first detector 4 to be in a first preset light intensity range when a cell in the cell suspension from the fluidics system does not reach the main optical axis or leaves away from the main optical axis; and enable the intensity of the light ray detected by the first detector 4 to be in a second preset light intensity range from a moment when the cell from the fluidics system reaches the main optical axis to a moment when the cell completely leaves away from the main optical axis, where light intensities in the second preset light intensity range are lower than light intensities in the first preset light intensity range.

In some optional embodiments, the laser 1 may be a gas laser, a solid-state laser, or a semiconductor laser.

In the above technical solution, the blocking assembly is configured to: enable the intensity of the light ray detected by the first detector 4 to be in a first preset light intensity range when a cell in the cell suspension from the fluidics system does not reach a central axis Z of the light spot; and enable the intensity of the light ray detected by the first detector 4 to be in a second preset light intensity range between a moment when the cell from the fluidics system begins to across the central axis Z and a moment when the cell completely leaves away from the central axis Z, where light intensities in the second preset light intensity range are lower than light intensities in the first preset light intensity range. In such a manner, a duration of the second preset light intensity range is a duration during which the cell passes through the central axis Z of the light spot, and the size of the cell can be calculated based on the duration of the second preset light intensity range and a speed of the cell passing through the central axis Z of the light spot. As compared with a flow cytometer in related technologies, adverse effects of a refractive index of a cell and the cell activity on measure of the cell size may be greatly reduced, thereby achieving accurate measure of a size of a cell.

Figure 2:
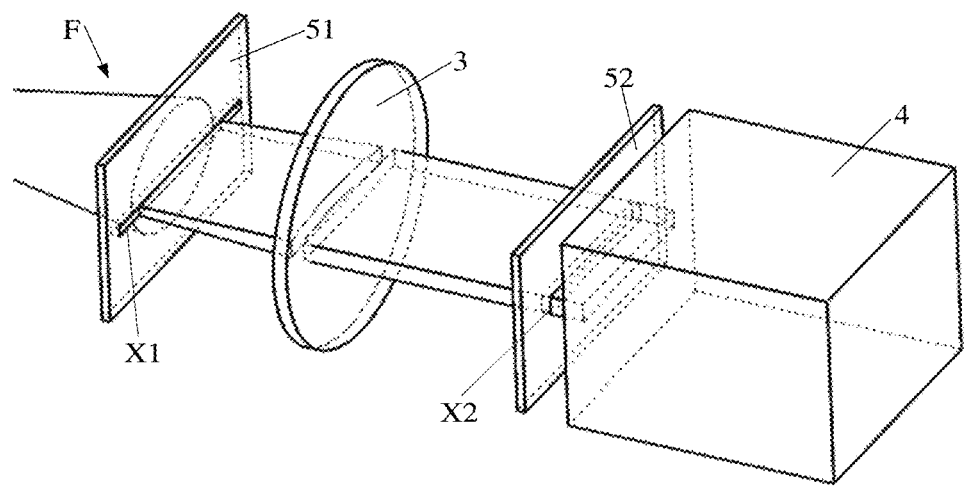
FIG. 2 is a partial schematic diagram of the forward scattered light detection system of FIG. 1.

In some optional embodiments, as shown in FIG. 2, the blocking assembly includes a first blocking plate 51 and a second blocking plate 52. The second blocking plate 52 is between the first lens 3 and the first detector 4, and the first blocking plate 51 is between the second blocking plate 52 and the fluidics system 10. The first blocking plate 51 is provided with a first slit at a position where the first blocking plate 51 intersects the main optical axis Z, and the second blocking plate 52 is provided with a second slit at a position where the second blocking plate 52 intersects the main optical axis Z.

In some optional embodiments, as shown in FIG. 2, all centers of the light focusing assembly 2, the first lens 3, the blocking assembly, and the first detector 4 are located on the main optical axis Z. When the cell suspension of the fluidics system flows to near the main optical axis Z, the light ray incident on the cell suspension is scattered by cells in the cell suspension.

In some optional embodiments, a width of the first slit along the flow direction of the cell suspension is greater than or equal to a width of the second slit along the flow direction of the cell suspension, and the width of the second slit is greater than a wavelength of the light ray. For example, the width of the first slit and the width of the second slit may be set to be larger than 0.01 mm to prevent the light entering the slits from generating a diffraction effect.

In order to realize that the light intensity detected by the first detector 4 when a cell does not across the central axis Z of the light spot is different from the light intensity detected by the first detector 4 when the cell contacts the central axis Z of the light spot, in some embodiments, the blocking assembly includes a first blocking plate 51 and a second blocking plate 52. The second blocking plate 52 is disposed between the first lens 3 and the first detector 4 and proximate to the first detector 4, and the first blocking plate 51 is disposed between the second blocking plate 52 and the fluidics system. The first blocking plate 51 is provided with a first slit X1 facing the central axis Z, that is, the central axis Z and the horizontal centerline of the first slit X1 are located on one plane perpendicular to a flow direction of the cell C, so that the first blocking plate 51 can block most of the light rays on the optical path to prevent a signal of the first detector 4 from being oversaturated, and can prevent most of the light rays scattered by the cell C (not including light rays propagating along and near the central axis Z of the light spot) from transmitting through the first slit X1. The second blocking plate 52 is provided with a second slit X2 facing the central axis Z, that is, the central axis Z and the horizontal centerline of the second slit X2 are located on one plane perpendicular to the flow direction of the cell C, so that the first blocking plate 52 can block most of the light rays on the optical path to prevent a signal of the first detector 4 from being oversaturated, and can prevent most of the light rays scattered by the cell C (not including the light propagating along and near the central axis Z of the light spot) from passing through the second slit X2. In such a structure, it can be ensured that the light ray passing through the first slit X1 and second slit X2 is the light ray that propagates along and is near the central axis Z of the light spot, and thus light rays received by the first detector 4 are light rays that propagate along and are near the central axis Z of the light spot. A width of the second slit X2 along the flow direction of the cell C is smaller than or equal to a width of the first slit X1 along the flow direction of the cell C, which is greater than a wavelength of the light.

The width of the second slit X2 is smaller than or equal to the width of the first slit X1, so that the second blocking plate 52 can better block the scattered light passing through the first slit X1 from passing through the second slit X2. In addition, the width of the first slit X1 and the width of the second slit X2 may depend on requirements on the measurement accuracy of the cell size. In order to prevent light incident on the first slit X1 and the second slit X2 from generating a diffraction effect, the widths of the first slit X1 and the second slit X2 may be much larger than the wavelength of the incident light. Wavelengths of light emitted by a laser commonly used in flow cytometers are in a visible light band and an ultraviolet light band, thus the widths of the first slit X1 and the second slit X2 may be set to be larger than 0.01 mm (which is an order of magnitude larger than the visible light band).

Figure 9:
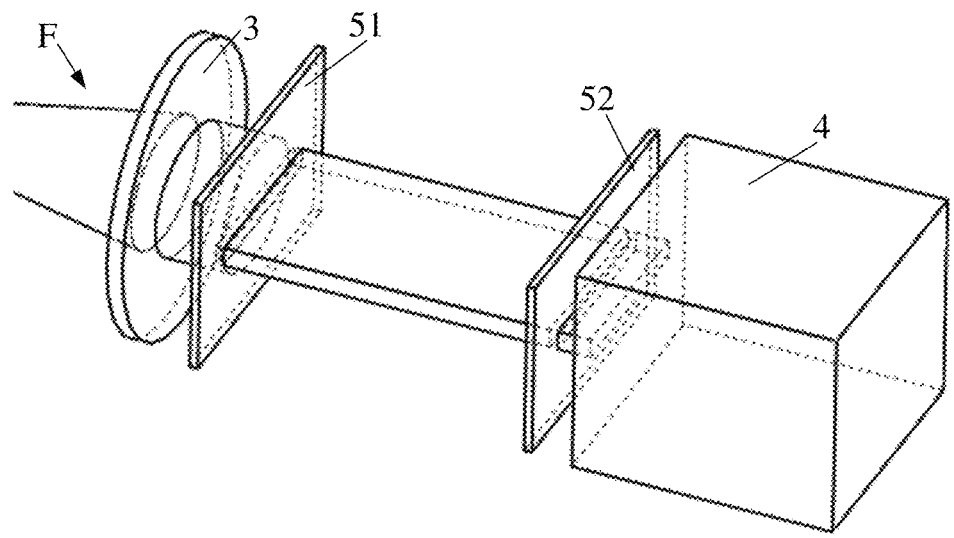
FIG. 9 is a partial schematic diagram of a forward scattered light detection system according to embodiments of the present disclosure.
Figure 10:
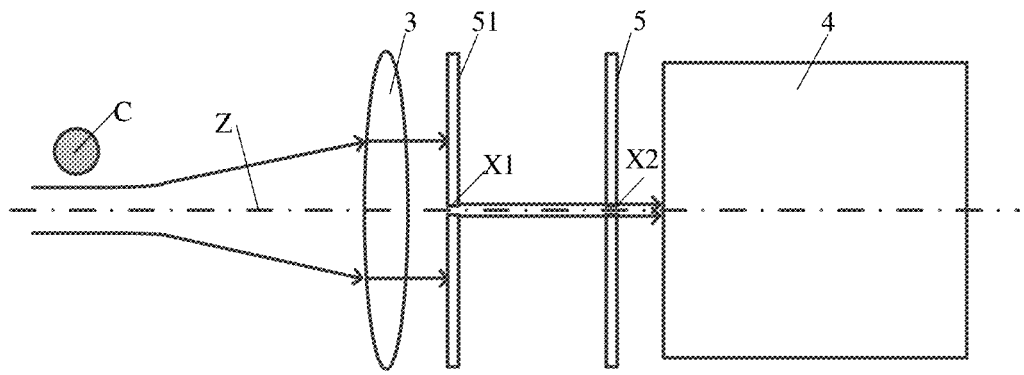
FIGS. 10-15 are optical path diagrams showing a process in which a cell passes through the forward scattered light detection system shown in FIG. 9.
Figure 11:
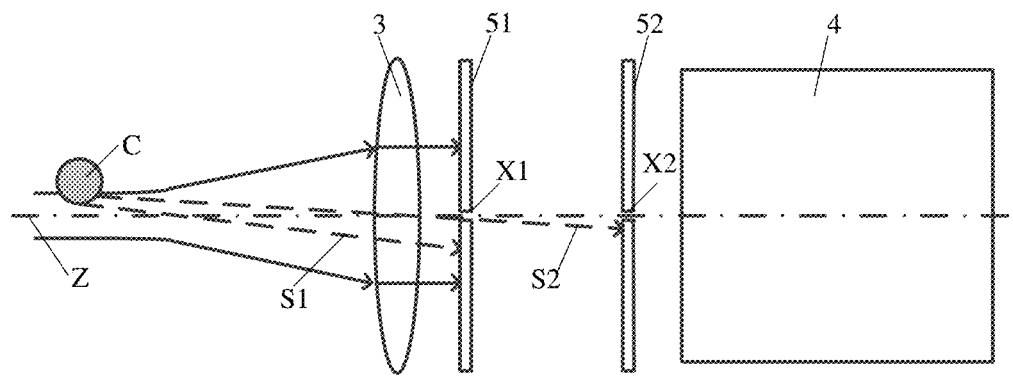
Figure 12:
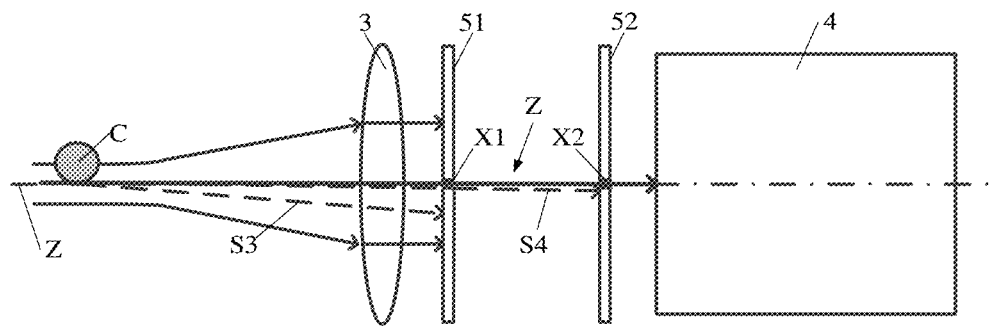
Figure 13:
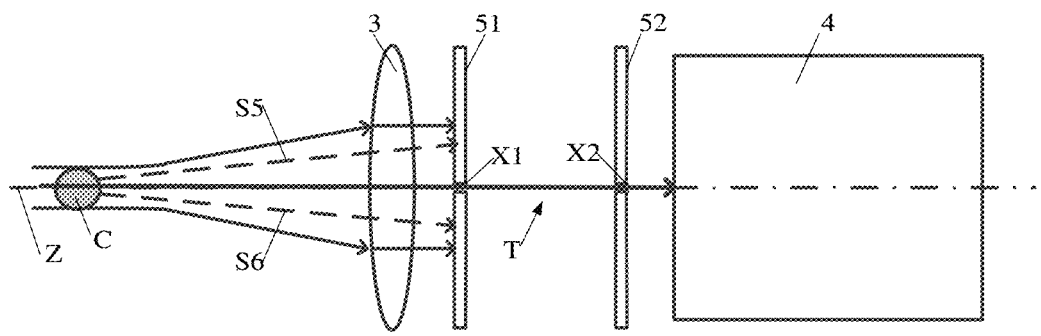
Figure 14:
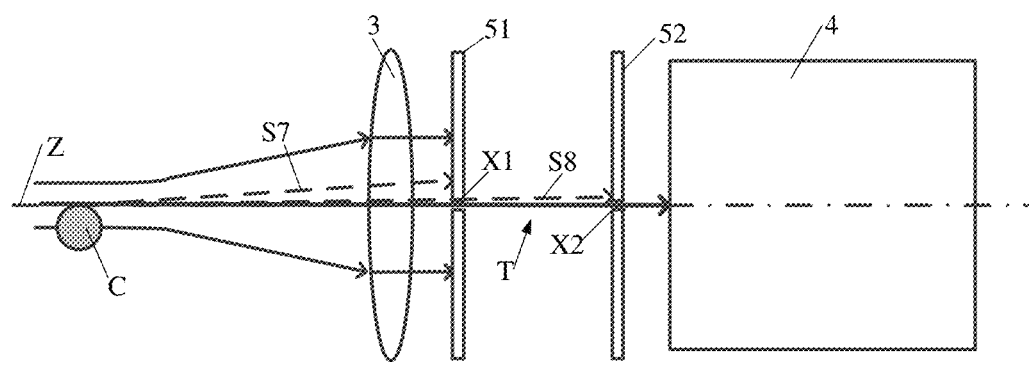
Figure 15:
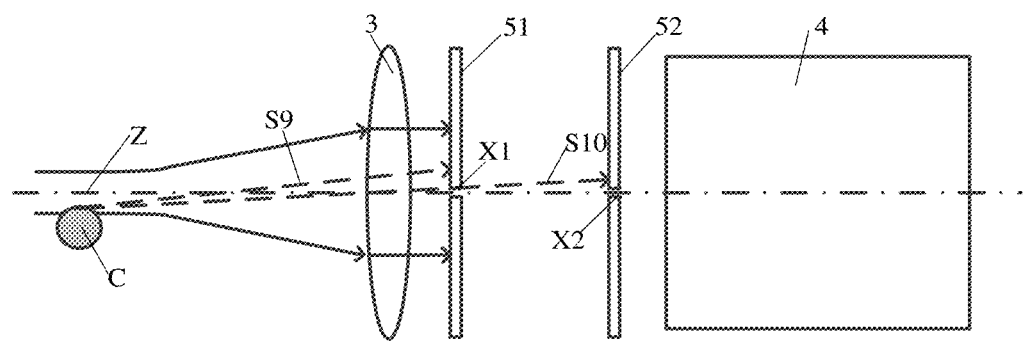

The first blocking plate 51 may be disposed in the following ways. As shown in FIG. 2, the first blocking plate 51 is disposed between the light focusing assembly 2 and the first lens 3, and the first slit X1 is located at a focal point of the first lens 3. Alternatively, as shown in FIG. 9, the first blocking plate 51 is disposed between the first lens 3 and the second blocking plate 52.

As shown in FIGS. 1-8, optionally, the first blocking plate 51 is disposed between the light focusing assembly 2 and the first lens 3, and the first slit X1 is located at the focal point of the first lens 3. In this way, most of forward scattered light rays F incident on the first blocking plate 51 are blocked, and only a small part of the forward scattered light rays F passes through the first slit X1, which is near the central axis Z of the light spot. Light rays passing through the first slit X1 are converted by the first lens 3 into parallel light rays, and part of the parallel light rays transmit through the second slit X2 of the second blocking plate 52 to reach the first detector 4. In light rays scattered by the cell C that are not near the central axis Z or do not propagate along the central axis Z, a part of the light rays may be blocked by the first blocking plate 51, and the other part of the light rays may transmitted through the first slit X1 and may be blocked by the second blocking plate 52 after passing through the first lens 3, so as to ensure that most of light rays passing through the first slit X1 and the second slit X2 are light rays that are near the central axis Z of the light spot and propagate along the central axis Z of the light spot.

Specifically, processes of cells passing through the light spot are as follows.

Figure 3:
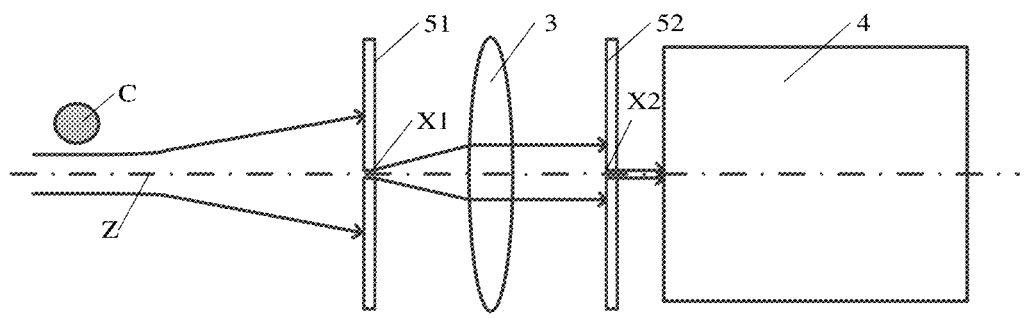
FIGS. 3-8 are optical path diagrams showing a process in which a cell passes through the forward scattered light detection system shown in FIG. 2.

As shown in FIG. 1 and FIG. 2, when incident light rays enter into a capillary tube 103 of the fluidics system 10, the incident light rays are scattered by the cell C, and the forward scattered light rays F are incident on the first blocking plate 51. The first slit X1 may be provided at a center position of the first blocking plate 51, and a horizontal centerline of the first slit X1 and the central axis Z of the light spot entering the capillary tube 103 are on a same horizontal plane, so as to ensure the light rays near the central axis Z of the light spot to transmit through the first slit X1, as shown in FIG. 3. Most of the light rays incident on the first blocking plate 51 is blocked, only a small part of the light rays transmits through the first slit X1 and is further converted by the first lens 3 into parallel light rays, and then part of the parallel light rays passes through the second slit X2 of the second blocking plate 52 and enters into the first detector 4. A horizontal centerline of the second slit X2 and the central axis Z of a light spot entering the capillary tube 103 are on a same horizontal plane, so as to ensure the light rays near the central axis Z of the light spot to transmit through the second slit X2.

FIG. 3 shows that no light is scattered in a case that the cell C does not reach the focused light spot in the capillary tube 103. In this case, the light rays propagate through the first blocking plate 51, the first lens 3, and the second blocking plate 52 in sequence, and a part of the light rays pass through the first slit X1 and the second slit X2 and reaches the first detector 4. An intensity of the light rays detected by the first detector 4 remains stable and is within a first preset light intensity range.

Figure 4:
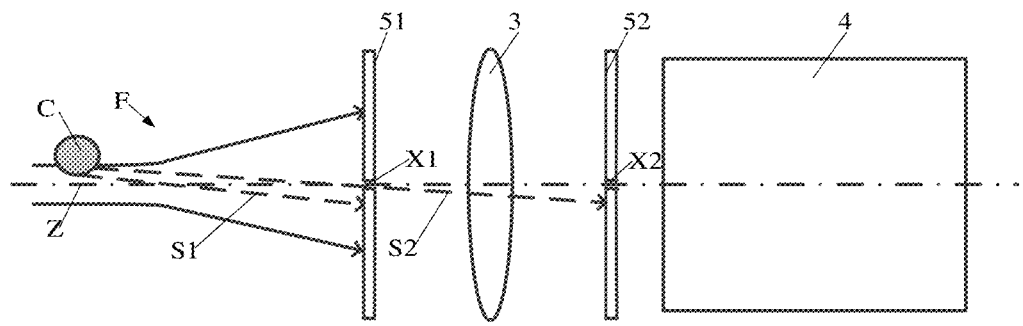

As shown in FIG. 4, the cell C reaches the focused light spot in the capillary tube 103 and does not reach the central axis Z of the focused light spot, part of light rays is scattered by the cell C, such as the scattered light ray S1 and the scattered light ray S2 in FIG. 4. The light ray S1 is blocked by the first blocking plate 51, and the scattered light ray S2 is able to transmit through the first slit X1 of the first blocking plate 51, but is blocked by the second blocking plate 52. Few scattered rays transmit through the first blocking plate 51 and the second blocking plate 52, thus the light intensity detected by the first detector 4 is basically unchanged, which is also within the first preset light intensity range.

Figure 5:
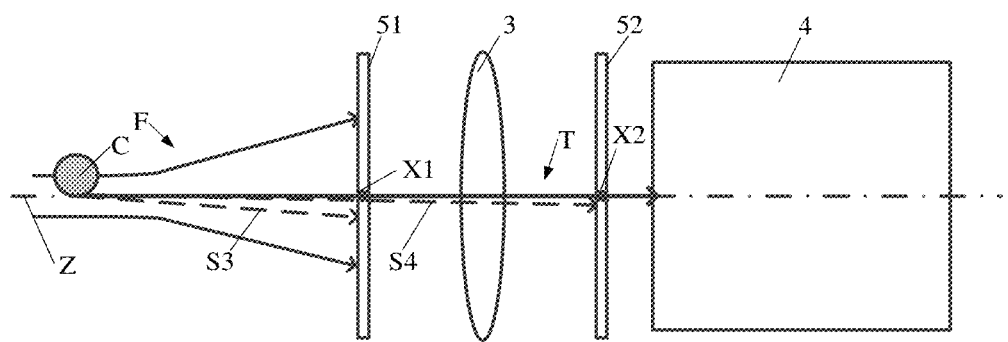

As shown in FIG. 5, a first side of the cell C reaches the central axis Z of the focused light spot in the capillary tube 103. Similar as in FIG. 4, the scattered light ray S3 in the FIG. 5 is blocked by the first blocking plate 51, and the scattered light ray S4 can transmit through the first blocking plate 51 of the first slit X1, but is blocked by the second blocking plate 52. As shown in FIG. 4, the light ray S4 originally propagates along the central axis Z and is able to pass through the first blocking plate 51 and the second blocking plate 52 without being scattered and enter into the first detector 4. However, in FIG. 5, as the light ray S4 propagating along the central axis Z (i.e., a direct transmission light ray T) is scattered by the cell C, the propagating direction of the scattered light ray S4 deviates from the central axis Z, and the scattered light ray S4 propagating deviating from the central axis Z cannot pass through the second slit X2, thus the intensity of the light rays detected by the first detector 4 may be decreased to a second preset light intensity range. According to preset program settings, the relevant program starts timing at this time.

Figure 6:
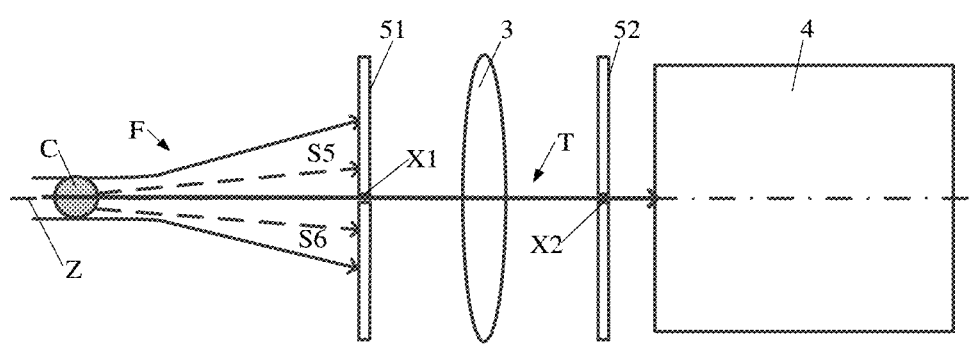

As shown in FIG. 6, the cell C completely enters the focused light spot of the capillary tube 103. As in FIG. 5, a direction of the direct transmission light ray T propagating along the central axis Z changes due to the blocking and scattering of the cell C. In this case, the scattered light rays are difficult to pass through the first slit X1 and the second slit X2 and can hardly enter the first detector 4, so the light intensity detected by the first detector 4 does not return to a normal value. That is, the light intensity detected by the first detector 4 does not return to the first preset light intensity range, and is still within the second preset light intensity range.

Figure 7:
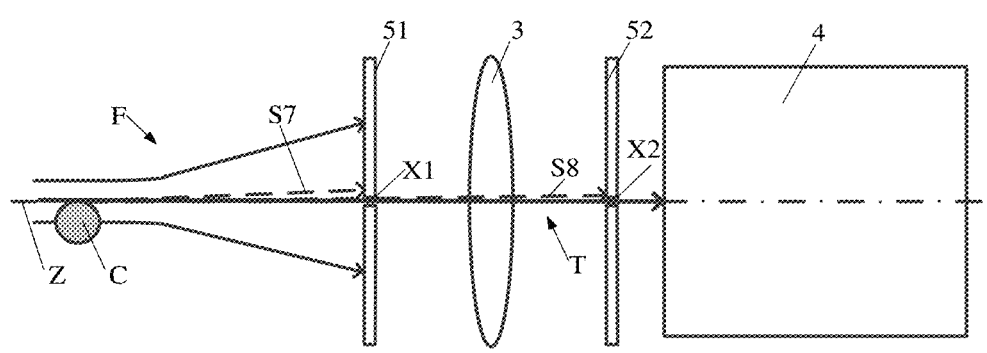

As shown in FIG. 7, a second side of the cell C reaches the central axis Z of the focused light spot. As in FIG. 5, the edge of the cell C scatters light rays near the central axis Z, such as the scattered light ray S7 and the scattered light ray S8 in the FIG. 7. The scattered light ray S7 is blocked by the first blocking plate 51, and the scattered light ray S8 can pass through the first slit X1 of the first blocking plate 51, but is blocked by the second blocking plate 52. Since part of the direct transmission light ray T propagating along the central axis Z is scattered, the light intensity detected by the first detector 4 does not return to the first preset light intensity range, and is still within the second preset light intensity range.

Figure 8:
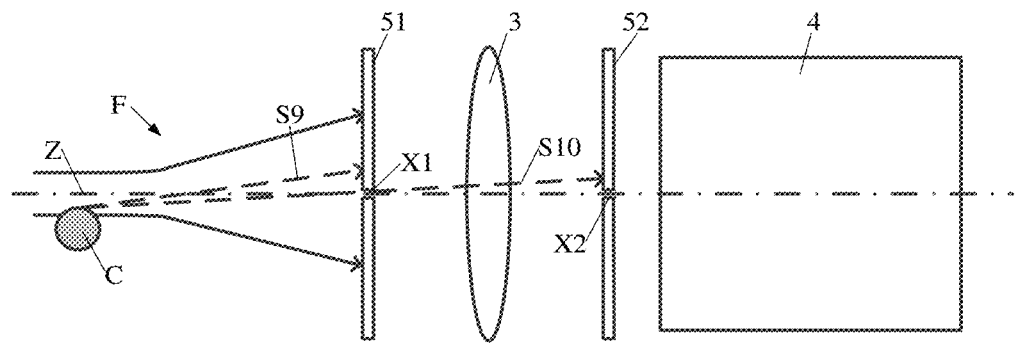

As shown in FIG. 8, the second side of cell C is away from the central axis Z of the focused light spot, but has not completely left the focused light spot. In this case, light rays near the central axis Z is not scattered, and can reach the first detector 4, which is similar as FIG. 2 and FIG. 3. Most of light rays that are not near the central axis Z cannot reach the first detector 4 in any cases. Thus, the light intensity of the signal received by the first detector 4 returns to a normal value, that is, within the first preset light intensity range. When the light intensity of the signal detected by the first detector 4 has just returned to a normal value, the timer set by the program stops counting.

A diameter value of a cell may be calculated, for example by a program, according to a time duration during which the light intensity detected by the first detector 4 is within the second preset light intensity range, and a drop speed of a cell droplet. Specifically, the diameter value of a cell may be calculated by multiplying the time duration during which the light intensity detected by the first detector 4 is within the second preset light intensity range by the drop speed of the cell droplet. Different cell suspensions, sheath fluids, and instrument structures may have different drop speeds. The drop speed of the cell droplet may be calibrated before the flow cytometer is used, which is not specifically limited herein.

As shown in FIGS. 9-15, in some optional embodiments, the first blocking plate 51 is disposed between the first lens 3 and the second blocking plate 52. In an embodiment, forward scattered light rays F are first focused into a parallel light beam by the first lens 3, and then the parallel light beam enters the first blocking plate 51 and the second blocking plate 52. Most of light in the light beam is blocked by the first blocking plate 51 and the second blocking plate 52, and only the light rays that are located near the central axis Z of the focused light spot and propagate along the central axis Z may pass through the first slit X1 of the first blocking plate 51 and the second slit X2 of the second blocking plate 52.

In addition, in FIGS. 9-15, the processes of the cell C passing through the light spot are similar to the processes in FIG. 2 to FIG. 8, where the scattered light rays S1, S3, S5, S6, S7 and S9 are blocked by the first blocking plate 51 and the scattered light rays S2, S4, S8 and S10 are able to pass through the first slit X1 of the first blocking plate 51, but are blocked by the second blocking plate 52.

As shown in FIG. 1, in some embodiments, in order to form a light spot with a uniform light intensity distribution, the light focusing assembly 2 includes a first cylindrical lens for laterally focusing light and a second cylindrical lens for vertical focusing light, so as to form the light spot. A shape of the light spot may be oval. The light spot irradiates cells in the capillary tube 103 of the fluidics system 10, and three kinds of light may be generated: forward scattered light F, side scattered light, and fluorescence emitted by a cell labeled with a fluorescent dye after being excited by the incident light.

In a second aspect, embodiments of the present disclosure provide a flow cytometer, which includes a fluidics system 10, a first light detection system 20, and the aforementioned forward scattered light detection system 30. The first light detection system 20 is configured to detect side scattered light rays when the light rays from the laser is scattered by the cell suspension, and detect fluorescence emitted by cells in the cell suspension labelled by a fluorescent dye. Since the flow cytometer in the embodiments includes the above-mentioned forward scattered light detection system, the flow cytometer has at least part of advantages of the forward scattered light detection system.

As shown in FIG. 16, in some embodiments, the fluidics system 10 includes:

a cylindrical steady flow cavity 101, configured to accommodate a sheath fluid;

a sample channel 104, configured to import a cell suspension, where the sample channel 104 is in a center of the cylindrical steady flow cavity 102, a conical confluent cavity 102, in communication with the cylindrical steady flow cavity 101 and the sample channel 104; and a capillary tube 103, connected to an exit of the conical confluent cavity 102, where an extending direction of the capillary tube 103 perpendicularly intersects the main optical axis of the forward scattered light detection system, where the fluidics system 10 is configured to: enable the sheath fluid and the cell suspension to simultaneously flow into the conical confluent cavity 102 respectively through the cylindrical steady flow cavity 101 and the sample channel 104, to make the sheath fluid encircle cells in the cell suspension after confluence; and enable the light rays to be scattered by the encircled cells that flow the capillary tube when the encircled cells flows to a position where the capillary tube intersects the main optical axis of the forward scattered light detection system.

A to-be-measured sample, i.e., the cell suspension, is placed in the sample channel 104 of the fluidics system 10, and the sheath fluid is placed in the cylindrical steady flow chamber 101 of the fluidics system. The cell suspension and the sheath fluid simultaneously flow into the conical confluent cavity 102 and further flow into the capillary tube 103, the sheath fluid surrounds the cells, and the cells C in the cell suspension are at the center of the capillary tube 103. Thus, the light rays focused in the capillary tube 103 can sufficiently irradiate on the cells C, and flow cells C can be prevented from blocking in the capillary tube 103. In addition, each kind of cell C may be labeled with a specific fluorescent dye.

In order to detect side scattered light and fluorescence, in some embodiments, the first light detection system 20 includes a second lens 201, convert the side scattered light rays and the fluorescence into parallel light rays. The first light detection system 20 further includes a first detection branch B1 that is at a main optical axis of the second lens and configured to detect the side scattered light ray transmitting through the second lens and a second detection branch B2 configured to detect the fluorescence transmitting through the second lens. The main optical axis of the forward scattered light detection system, the main optical axis of the second lens, and the flow direction of a cell suspension in the fluidics system are perpendicular to each other.

In some embodiments, the first detection branch B1 includes a first dichroic mirror B11, a third lens B12 and a second detector B13. The first dichroic mirror B11 is used to reflect the side scattered light ray transmitting through the second lens 201 to the third lens B12 for focus. The second detector B13 is configured to receive the side scattered light after being focused by the third lens B12.

In some embodiments, the second detection branch B2 includes a second dichroic mirror B21, a fourth lens B22 and a third detector B23. The second dichroic mirror B21 is configured to reflect fluorescence transmitting through the second lens 201 and first dichroic mirror B11 to the fourth lens B22, and the third detector B23 is configured to receive the fluorescence after being converged by the fourth lens B22.

The first light detection system 20 may include a plurality of second detection branches for detecting fluorescence of different colors. As shown in FIG. 16, the first light detection system 20 may further include a second detection branch B2' and B2", and the second detection branch B2' includes a second dichroic mirror B21', a fourth lens B22' and a third detectors B23'. The second dichroic mirror B21' is used to reflect the fluorescence passing through the second lens 201 and the second dichroic mirror B21 to the fourth lens B22', and the third detector B23' is used to receive the fluorescence after being converged by the fourth lens B22'. The second detection branch B2" includes the second dichroic mirror B21', a fourth lens B22", and a third detector B23", where the fluorescence transmitting through the dichroic mirror B21' enters the fourth lens B22", and the fluorescence converged by the fourth lens B22" is received by the third detector B23".

Specifically, the side scattered light and the fluorescence transmitting through the second lens 201 are converted to corresponding parallel light rays, and each of the parallel side scattered light ray and the parallel fluorescence ray is split into two light rays in perpendicular directions by the first dichroic mirror B11, the second dichroic mirror B21, or the second dichroic mirror B21. The dichroic mirror is used to reflect light in a certain band and transmit light in other bands. According to actual needs, the dichroic mirror has different settings for reflection and transmission in different light bands. As an example, the first color mirror B11 reflects the side scattered light in a certain wavelength band, such as reflecting the light emitted by the laser 1 within a certain wavelength band while transmitting other wavelength bands, thus the fluorescence emitted after the excitation light is absorbed by the fluorescent dye transmits through the first dichroic mirror B11. The second dichroic mirror B21 may be set to reflect red light and transmit other light; and the second dichroic mirror B21' may be set to reflect green light and transmit other light.

In FIG. 16, the first dichroic mirror B11 reflects side scattered light and transmits fluorescence, and the side scattered light reflected by the first dichroic mirror B11 is converged by the third lens B12 and is incident on the second detector B13. The second dichroic mirror B21 reflects the fluorescence in a certain band and transmits light in other bands, and the reflected fluorescence is converged by the fourth lens B22 and incident on the third detector B23. The second dichroic mirror B21' reflects the fluorescence in a certain band and transmits the fluorescence in other bands, and the reflected fluorescence is converged by the fifth lens B22' and incident on the fourth detector B23'. The fluorescence transmitted through the second dichroic mirror B21' is converged by the sixth lens B22" and the converged fluorescence enters into the fifth detector B23".

Signals detected by detectors may be input into a computer program for analysis, and types of cells may be determined based on a forward scattered light signal, a side scattered light signal, and a fluorescent signal.

In order to classify different cells, in some embodiments, the flow cytometer includes a cell sorting system 40, which includes:

a charging device 401, disposed at a liquid outlet of the fluidics system 10 (for example, at a nozzle of a capillary tube 103, where the cell suspension with cells passes through the capillary tube 103 and drops down), and configured to apply a positive voltage or a negative voltage to a part of cells in the cell suspension;

a first deflecting plate 402 and a second deflecting plate 403 that are opposite to each other and are spaced below the charging device 401, where a first container R1 is provided below the first deflecting plate 402 and is configured to receive positively charged cells, and a second container R2 is provided below the second deflecting plate 403 and is configured to receive negatively charged cells; and a third container R3, disposed between the first container and the second container and located below the liquid outlet, and configured to receive uncharged cells.

The function of the charging device 401 is to sort different cells by applying a positive voltage, a negative voltage, or no voltage on droplets including different cells C, and types of different cells may be determined based on a computer program. Below the charging device 401 are two voltage plates including a first deflection plate 402 and a second deflection plate 403. For example, voltages of the two voltage plates may be +150V and −150V, respectively. Since some droplets are applied with voltages, the positively charged droplets are deflected toward the first deflection plate 402 and enter the first container R1, the negatively charged droplets are deflected toward the second deflection plate 403 and enter the second container R2, and the uncharged droplets freely fall into the third container R3, which, for example, may be acted as waste liquid. Therefore, classification of different cells is achieved.

In the flow cytometer of the present disclosure, the first blocking plate 51 and the second blocking plate 52 are provided in front of the first detector 4 and behind the forward scattered light F, the first blocking plate 51 is provided with a first slit X1, the second blocking plate 52 is provided with a second slit X2, and the first slit X1 and the second slit X2 correspond to the position of the central axis Z of the focused light spot. When the cell C does not reach the focused light spot, the light intensity detected by the first detector 4 is within the first preset light intensity range.

When the cell C reaches the focused light spot but does not reach the central axis Z of the focused light spot, part of light is scattered by the cell C, but the scattered light can hardly pass through the first slit X1 and the second slit X2, and fails to reach the first detector 4, and most of the scattered light is blocked by the first blocking plate 51 and the second blocking plate 52, so an light intensity detected by the first detector 4 is still within the first preset light intensity range. When the cell C reaches the central axis Z of the focused light spot, the light near the central axis Z is scattered in different directions, and most of the scattered light may be blocked by the first blocking plate 51 and the second blocking plate 52, thus the light intensity of the first detector 4 is decreased to a second preset light intensity range, the timing starts at this time, and the timing stops until the cell C completely leaves the central axis Z, and the light intensity returns to the normal value. The size of the cell may be calculated based on the time duration of the second preset light intensity range and a speed of the cell passing through the central axis Z of the light spot. As compared with a flow cytometer in related technologies, adverse effects of a refractive index of a cell and the cell activity on measure of the cell size may be greatly reduced, thereby achieving accurate measure of a size of a cell.

Figure 17:
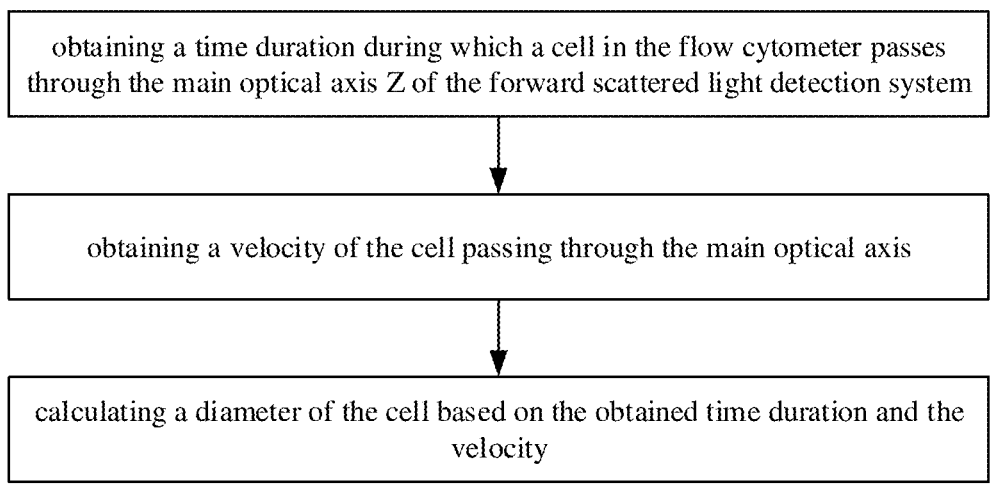
FIG. 17 is a flowchart of a method for measuring a cell diameter according to optional embodiments of the present disclosure.

In a third aspect, as shown in FIG. 17, embodiments of the present disclosure further provides a method for measuring a cell diameter, including:

obtaining a time duration during which a cell in the flow cytometer passes through the main optical axis Z of the forward scattered light detection system;

obtaining a velocity of the cell passing through the main optical axis; and calculating a diameter of the cell based on the obtained time duration and the velocity.

In the embodiments of the present disclosure, a time duration during which a cell in the flow cytometer passes through the main optical axis of the forward scattered light detection system is obtained; a velocity of the cell passing through the main optical axis is obtained; and a diameter of the cell based on the obtained time duration and the velocity is calculated. In this way, the size of cell C can be calculated based on the time duration during which a cell in the flow cytometer passes through the main optical axis Z and the velocity of the cell passing through the main optical axis. Specifically, the diameter value of a cell may be calculated by multiplying the time duration during which the light intensity detected by the first detector 4 is within the second preset light intensity range by the drop speed of the cell droplet. Thus, adverse effects of a refractive index of a cell and the cell activity on measure of the cell size may be greatly reduced, thereby achieving accurate measure of a size of a cell.

In some embodiments, an intensity of the light ray detected by the first detector 4 is in a first preset light intensity range when a cell in the cell suspension from the fluidics system does not reach a central axis Z; and an intensity of the light ray detected by the first detector 4 is in a second preset light intensity range between a moment when the cell from the fluidics system begins to across the central axis Z and a moment when the cell completely leaves away from the central axis Z, where light intensities in the second preset light intensity range are lower than light intensities in the first preset light intensity range. The obtaining the time duration during which the cell in the flow cytometer passes through the main optical axis Z of the forward scattered light detection system includes: recording a first moment when the detected light intensity is switching from the first preset light intensity range to the second preset light intensity range; recording a second moment when the detected light intensity is switching from the second preset light intensity range to the first preset light intensity range; and subtracting the first moment from the second moment to obtain the time duration during which the cell in the flow cytometer passes through the main optical axis Z of the forward scattered light detection system. For example, the first moment is recorded as 0, that is, the time counting is started at the moment, and the time recorded at the second moment is the time duration during which the cell in the flow cytometer passes through the main optical axis Z. In some embodiments, the above-mentioned flow cytometer is configured to obtain the time duration and the velocity of the cell C flowing through the main optical axis Z.

The above embodiments are merely optional embodiments of the present disclosure. It should be noted that numerous improvements and modifications may be made by persons of ordinary skill in the art without departing from the principle of the present disclosure, and these improvements and modifications shall also fall within the scope of the present disclosure.

What is claimed is:

1. A forward scattered light detection system, applied to a flow cytometer, comprising:
   a laser, configured to emit light rays;
   a light focusing assembly, configured to focus the light rays as a light spot;
   a first lens, configured to convert the light spot to parallel light rays, wherein a center of the light spot is located on a main optical axis of the first lens;
   a blocking assembly, configured to transmit a light ray propagating along and near the main optical axis through the blocking assembly and block most of the light rays propagating in directions other than the main optical axis; and
   a first detector, configured to detect an intensity of the light ray transmitted from the blocking assembly to the first detector,
   wherein a fluidics system of the flow cytometer is between the light focusing assembly and the first lens, and the main optical axis is perpendicular to and intersected with a flow direction of a cell suspension in the fluidics system,
   wherein the blocking assembly comprises a first blocking plate and a second blocking plate arranged on two opposite sides of the first lens,
   wherein the second blocking plate is between the first lens and the first detector and close to the first detector, and the first blocking plate is between the first lens and the light focusing assembly,
   wherein the first blocking plate is provided with a first slit at a position where the first blocking plate intersects the main optical axis, and the second blocking plate is provided with a second slit at a position where the second blocking plate intersects the main optical axis, and
   wherein the first slit and the second slit are parallel to each other and are perpendicular to the main optical axis, and a width of the second slit is less than or equal to a width of the first slit.

2. The forward scattered light detection system according to claim 1, wherein the blocking assembly is further configured to:
   enable the intensity of the light ray detected by the first detector to be in a first light intensity range when a cell in the cell suspension from the fluidics system does not contact the main optical axis; and enable the intensity of the light ray detected by the first detector to be in a second light intensity range when the cell in the cell suspension from the fluidics system flows to contact the main optical axis, wherein light intensities in the second light intensity range are lower than light intensities in the first light intensity range.

3. The forward scattered light detection system according to claim 1, wherein the width of the first slit along the flow direction of the cell suspension is greater than or equal to a width of the second slit along the flow direction of the cell suspension, and the width of the second slit is greater than a wavelength of the light rays emitted by the laser.

4. The forward scattered light detection system according to claim 1, wherein the laser, the light focusing assembly, the first blocking plate, the first lens, the second blocking plate, and the first detector are arranged in sequence along the main optical axis, and the first slit is at a focal point of the first lens.

5. The forward scattered light detection system according to claim 1, wherein the laser, the light focusing assembly, the first lens, the first blocking plate, the second blocking plate, and the first detector are arranged in sequence along the main optical axis.

6. The forward scattered light detection system according to claim 1, wherein the light focusing assembly comprises: a first cylindrical lens and a second cylindrical lens that are on the main optical axis; and the first cylindrical lens is configured to focus the light rays emitted by the laser along the main optical axis, and the second cylindrical lens is configured to focus the light rays emitted by the laser along the flow direction of the cell suspension, to enable the light rays passing through the light focusing assembly to form the light spot.

7. The forward scattered light detection system according to claim 1, wherein centers of the light focusing assembly, the first blocking plate, the second blocking plate, and the first detector are located on the main light axis, and the light rays incident on the cell suspension are scattered by cells in the cell suspension when the cell suspension of the fluidics system flows near the main optical axis.

8. A flow cytometer comprising:
a forward scattered light detection system that comprises:
  a laser, configured to emit light rays;
  a light focusing assembly, configured to focus the light rays as a light spot;
  a first lens, configured to convert the light spot to parallel light rays, wherein
    a center of the light spot is located on a main optical axis of the first lens;
  a blocking assembly, configured to transmit a light ray propagating along and near the main optical axis through the blocking assembly and block most of the light rays propagating in directions other than the main optical axis, wherein the blocking assembly comprises a first blocking plate and a second blocking plate arranged on two opposite sides of the first lens; and
  a first detector, configured to detect an intensity of the light ray transmitted from the blocking assembly to the first detector; and
a fluidics system between the light focusing assembly and the first lens, wherein the main optical axis is perpendicular to and intersected with a flow direction of a cell suspension in the fluidics system, wherein the fluidics system comprises:
  a cylindrical steady flow cavity, configured to accommodate a sheath fluid;
  a sample channel, configured to import the cell suspension, wherein the sample channel is in a center of the cylindrical steady flow cavity, a conical confluent cavity, in communication with the cylindrical steady flow cavity and the sample channel; and
  a capillary tube, connected to an exit of the conical confluent cavity, wherein an extending direction of the capillary tube perpendicularly intersects the main optical axis of the forward scattered light detection system, and wherein the fluidics system is configured to:
  enable the sheath fluid and the cell suspension to simultaneously flow into the conical confluent cavity respectively through the cylindrical steady flow cavity and the sample channel, to make the sheath fluid encircle a cell in the cell suspension after confluence; and
  enable the light rays to be scattered by the encircled cell that flows in the capillary tube when the encircled cell flows to a position where the capillary tube intersects the main optical axis of the forward scattered light detection system.

9. The flow cytometer according to claim 8, further comprising: a first light detection system configured to detect side scattered light rays when the light rays from the laser are scattered by the cell suspension, and detect fluorescence emitted by cells in the cell suspension labelled by a fluorescent dye.

10. The flow cytometer according to claim 9, wherein the first light detection system comprises:
  a second lens, configured to convert the side scattered light rays and the fluorescence into parallel light rays;
  a first detection branch at a main optical axis of the second lens, configured to detect the side scattered light ray transmitting through the second lens; and
  a second detection branch, configured to detect the fluorescence transmitting through the second lens,
wherein the main optical axis of the forward scattered light detection system, the main optical axis of the second lens, and the flow direction of the cell suspension in the fluidics system are perpendicular.

11. The flow cytometer according to claim 10, wherein the first detection branch comprises a first dichroic mirror, a third lens, and a second detector, the first dichroic mirror is configured to reflect the side scattered light ray from the second lens to the third lens, and the second detector is configured to receive the side scattered light after being converged by the third lens.

12. The flow cytometer according to claim 10, wherein the second detection branch comprises a second dichroic minor, a fourth lens and a third detector, the second dichroic minor is configured to reflect the fluorescence from the second lens to the fourth lens, and the third detector is configured to receive the fluorescence after being converged by the fourth lens.

13. The flow cytometer according to claim 8, further comprising a cell sorting system, wherein the cell sorting system comprises:

a charging device, disposed at a liquid outlet of the fluidics system, and configured to apply a positive voltage or a negative voltage to a part of cells in the cell suspension;

a first deflecting plate and a second deflecting plate, that are below the charging device and arranged symmetrically along the extended direction of the capillary tube, wherein a first container is provided below the first deflecting plate and is configured to receive the positively charged cells, and a second container is provided below the second deflecting plate and is configured to receive the negatively charged cells; and a third container, disposed between the first container and the second container and located below the liquid outlet, and configured to receive the uncharged cells.

14. The flow cytometer according to claim 8, wherein:
the second blocking plate is between the first lens and the first detector, and the first blocking plate is between the second blocking plate and the fluidics system; and
the first blocking plate is provided with a first slit at a position where the first blocking plate intersects the main optical axis, and the second blocking plate is provided with a second slit at a position where the second blocking plate intersects the main optical axis.

15. The flow cytometer according to claim 14, wherein the laser, the light focusing assembly, the first blocking plate, the first lens, the second blocking plate, and the first detector are arranged in sequence along the main optical axis of the forward scattered light detection system.

16. The flow cytometer according to claim 14, wherein the laser, the light focusing assembly, the first lens, the first blocking plate, the second blocking plate, and the first detector are arranged in sequence along the main optical axis of the forward scattered light detection system.

17. A method for measuring a cell diameter, applied to the flow cytometer according to claim 8, comprising:
obtaining a time duration during which a cell in the flow cytometer passes through the main optical axis of the forward scattered light detection system;
obtaining a velocity of the cell passing through the main optical axis; and
calculating a diameter of the cell based on the obtained time duration and the velocity.

18. The method for measuring the cell diameter according to claim 17, wherein the intensity of the light rays detected by the first detector is in a first light intensity range when a cell in the cell suspension from the fluidics system does not contact the main optical axis of the forward scattered light detection system, and an intensity of the light ray detected by the first detector is in a second light intensity range when the cell in the cell suspension from the fluidics system flows to contact the main optical axis of the forward scattered light detection system, and
the obtaining the time duration during which the cell in the flow cytometer passes through the main optical axis of the forward scattered light detection system comprises:
recording a first moment when the detected light intensity is switched from the first light intensity range to the second light intensity range;
recording a second moment when the detected light intensity is switched from the second light intensity range to the first light intensity range; and
subtracting the first moment from the second moment to obtain the time duration during which the cell in the flow cytometer passes through the main optical axis of the forward scattered light detection system.

* * * * *